US012097851B2

(12) United States Patent
Komuro et al.

(10) Patent No.: US 12,097,851 B2
(45) Date of Patent: Sep. 24, 2024

(54) MOBILE OBJECT CONTROL DEVICE, MOBILE OBJECT CONTROL METHOD, AND STORAGE MEDIUM

(71) Applicant: HONDA MOTOR CO., LTD., Tokyo (JP)

(72) Inventors: Misa Komuro, Wako (JP); Yosuke Sakamoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 164 days.

(21) Appl. No.: 17/680,412

(22) Filed: Feb. 25, 2022

(65) Prior Publication Data

US 2022/0289189 A1 Sep. 15, 2022

(30) Foreign Application Priority Data

Mar. 11, 2021 (JP) ................................. 2021-038873

(51) Int. Cl.
*B60W 30/14* (2006.01)
*B60W 30/095* (2012.01)
(Continued)

(52) U.S. Cl.
CPC ...... *B60W 30/143* (2013.01); *B60W 30/0956* (2013.01); *B60W 40/04* (2013.01);
(Continued)

(58) Field of Classification Search
CPC ..... B60W 2554/4041; B60W 2554/80; B60W 2554/20; B60W 30/18145;
(Continued)

(56) References Cited

U.S. PATENT DOCUMENTS

2018/0276485 A1* 9/2018 Heck ....................... G06N 7/01
2020/0406747 A1 12/2020 Sakai
(Continued)

FOREIGN PATENT DOCUMENTS

JP 2006-260217 9/2006
JP 2017-001596 1/2017
(Continued)

OTHER PUBLICATIONS

Japanese Office Action for Japanese Patent Application No. 2021-038873 dated Jul. 23, 2024.

*Primary Examiner* — Peter D Nolan
*Assistant Examiner* — Demetra R Smith-Stewart
(74) *Attorney, Agent, or Firm* — Amin, Turocy & Watson, LLP (57) ABSTRACT

A mobile object control device includes a recognizer that recognizes a surroundings situation of a mobile object, and a controller that controls an acceleration and deceleration of the mobile object based on the surroundings situation recognized by recognize, and the controller sets a risk area at a first reference position based on an end of an obstacle present around the mobile object in a traveling direction of the mobile object when a predicted trajectory in which another mobile object is estimated to move and a future trajectory of the mobile object interfere with each other, and the length of a target area corresponding to the predicted trajectory in a predicted trajectory direction is equal to or larger than a predetermined length with respect to the target area difficult for the recognizer to recognize due to the obstacle, and controls at least the speed of the mobile object based on the set risk area.

8 Claims, 10 Drawing Sheets

(51) Int. Cl.
    *B60W 40/04*     (2006.01)
    *B60W 50/00*     (2006.01)
    *G01S 13/931*     (2020.01)
    *G01S 17/931*     (2020.01)
    *G06V 20/58*     (2022.01)

(52) U.S. Cl.
    CPC ....... B60W 50/0097 (2013.01); G01S 13/931 (2013.01); G01S 17/931 (2020.01); G06V 20/58 (2022.01); *B60W 2420/403* (2013.01); *B60W 2420/408* (2024.01); *B60W 2520/06* (2013.01); *B60W 2554/4041* (2020.02); *B60W 2554/80* (2020.02)

(58) Field of Classification Search
    CPC ....... B60W 30/18154; B60W 2720/10; B60W 30/09; B60W 30/0953; B60W 30/08; B60W 60/0011; G01S 13/865; G01S 13/867; G01S 17/86; G06V 10/44; G06V 20/588

See application file for complete search history.

(56) References Cited

U.S. PATENT DOCUMENTS

| | | |
|---|---|---|
| 2021/0027629 A1 | 1/2021 | Tao et al. |
| 2021/0039636 A1 | 2/2021 | Kamiya et al. |
| 2021/0061269 A1 | 3/2021 | Petroff et al. |
| 2021/0300348 A1* | 9/2021 | Yasui .................... G08G 1/167 |
| 2021/0300362 A1* | 9/2021 | Yasui .................... B60W 50/14 |

FOREIGN PATENT DOCUMENTS

| | | |
|---|---|---|
| JP | 2017-206117 | 11/2017 |
| JP | 2019-191839 | 10/2019 |
| JP | 2020-123090 | 8/2020 |
| WO | 2019/098323 | 5/2019 |

* cited by examiner

Rsk

MOBILE OBJECT CONTROL DEVICE, MOBILE OBJECT CONTROL METHOD, AND STORAGE MEDIUM

CROSS-REFERENCE TO RELATED APPLICATION

Priority is claimed on Japanese Patent Application No. 2021-038873, filed Mar. 11, 2021, the content of which is incorporated herein by reference.

BACKGROUND

Field of the Invention

The present invention relates to a mobile object control device, a mobile object control method, and a storage medium.

Description of Related Art

In the related art, a control device that determines a stop position of a host vehicle based on a level at which stop is allowed and a possibility of collision at an intersection when another vehicle traveling in a lane intersecting a target trajectory of the host vehicle is detected is disclosed (Japanese Unexamined Patent Application, First Publication No. 2017-001596).

SUMMARY

However, in the above technology, there is a case in which the mobile object cannot be appropriately controlled. For example, there is a case in which the mobile object is not appropriately controlled when there is an area shielded by an obstacle.

The present invention has been made in consideration of such circumstances, and an object of the present invention is to provide a mobile object control device capable of appropriately controlling a moving body, a mobile object control method, and a storage medium.

The following configurations has been adopted for the mobile object control device, the mobile control method, and the storage medium according to the present invention.

(1): A mobile object control device includes: a storage device configured to store a program; and a hardware processor, wherein the hardware processor recognizes a surroundings situation of a mobile object, executes control processing for controlling an acceleration and deceleration of the mobile object based on the recognized surroundings situation, and sets a risk area at a first reference position based on an end of an obstacle present around the mobile object in a traveling direction of the mobile object when a predicted trajectory in which another mobile object is estimated to move and a future trajectory of the mobile object interfere with each other, and the length of a target area corresponding to the predicted trajectory in a predicted trajectory direction is equal to or larger than a predetermined length with respect to the target area difficult to recognize due to the obstacle, and controls at least the speed of the mobile object based on the set risk area, in the control processing, by executing a program stored in the storage device.

(2) In the aspect (1), the hardware processor decelerates the mobile object when the mobile object approaches the risk area.

(3): In the aspect (1), the hardware processor increases a size of the risk area to be set when the mobile object approaches the predicted trajectory.

(4): In the aspect (1), the hardware processor increases a size of the risk area to be set when the mobile object approaches the predicted trajectory, and decelerates the mobile object when the mobile object approaches the risk area.

(5): In the aspect (1), the hardware processor controls at least the speed of the mobile object based on the risk area and moves the mobile object so that the mobile object does not enter an opposite lane.

(6): In the aspect (1), the hardware processor determines a size of the risk area based on a recommended speed on a road on which there is the mobile object and a distance from a second reference position based on an intersection between the predicted trajectory and the future trajectory to the mobile object.

(7): In the aspect (1), the hardware processor sets the risk area when the predicted trajectory and the future trajectory interfere with each other, the length of the target area in the predicted trajectory direction is equal to or larger than the predetermined length, and the target area is an area in which the mobile object directed to an intersection of the predicted trajectory and the future trajectory moves, and does not set the risk area when the predicted trajectory and the future trajectory interfere with each other, the length of the target area in the predicted trajectory direction is equal to or larger than the predetermined length, and the target area is an area in which the mobile object passing through the intersection of the predicted trajectory and the future trajectory moves.

(8): A mobile object control method according to an aspect of the present invention includes recognizing, by a computer, a surroundings situation of a mobile object; controlling, by the computer, an acceleration and deceleration of the mobile object based on the recognized surroundings situation; and setting, by the computer, a risk area at a first reference position based on an end of an obstacle present around the mobile object in a traveling direction of the mobile object when a predicted trajectory in which another mobile object is estimated to move and a future trajectory of the mobile object interfere with each other, and the length of a target area corresponding to the predicted trajectory in a predicted trajectory direction is equal to or larger than a predetermined length with respect to the target area difficult to recognize due to the obstacle, and controlling at least the speed of the mobile object based on the set risk area.

(9): A storage medium according to an aspect of the present invention is a computer-readable non-transitory storage medium having a program stored therein, the program causing a computer to: recognize a surroundings situation of a mobile object; control an acceleration and deceleration of the mobile object based on the recognized surroundings situation; and set a risk area at a first reference position based on an end of an obstacle present around the mobile object in a traveling direction of the mobile object when a predicted trajectory in which another mobile object is estimated to move and a future trajectory of the mobile object interfere with each other, and the length of a target area corresponding to the predicted trajectory in a predicted trajectory direction is equal to or larger than a predetermined length with respect to the target area difficult to recognize due to the obstacle, and control at least the speed of the mobile object based on the set risk area.

According to (1) to (9), the mobile object control device can control the mobile object more appropriately by setting the risk area when the target area satisfies a predetermined condition.

According to (2) or (4), the mobile object control device can more appropriately decelerate the mobile object according to the surroundings situation.

According to (6), the control device can appropriately set the size of the risk area according to an environment of a road.

According to (7), since the control device does not set the risk area when the target area is an area in which a mobile object passing through an intersection of the predicted trajectory and the future trajectory moves, it is possible to reduce a setting of an unnecessary risk area.

DESCRIPTION OF EMBODIMENTS

Hereinafter, embodiments of a mobile object control device, a mobile object control method, and a storage medium of the present invention will be described with reference to the drawings. As used throughout this disclosure, the singular forms "a," "an," and "the" include plural reference unless the context clearly dictates otherwise. In the present embodiment, a mobile object will be described as a vehicle, but the present embodiment may be applied to another mobile object different from the vehicle.

[Overall Configuration]

Figure 1:
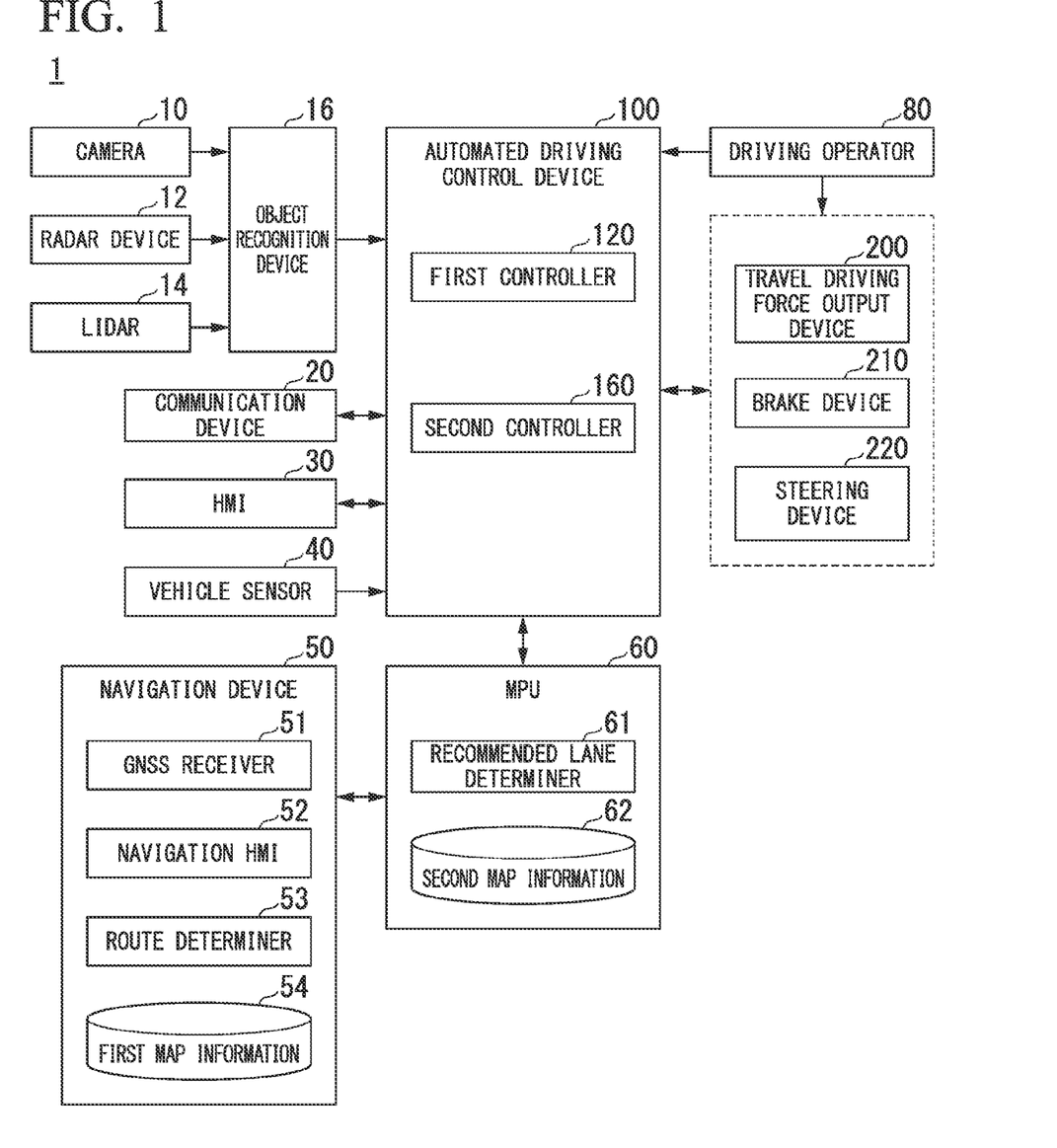
FIG. 1 is a configuration diagram of a vehicle system using a vehicle control device according to an embodiment.

FIG. 1 is a configuration diagram of a vehicle system 1 using a vehicle control device according to an embodiment. A vehicle on which the vehicle system 1 is mounted is, for example, a vehicle such as a two-wheeled vehicle, a three-wheeled vehicle, or a four-wheeled vehicle. A driving source thereof includes an internal combustion engine such as a diesel engine or a gasoline engine, an electric motor, or a combination thereof. The electric motor operates using power generated by a power generator connected to the internal combustion engine or discharge power of a secondary battery or a fuel cell.

The vehicle system 1 includes, for example, a camera 10, a radar device 12, a light detection and ranging (LIDAR) 14, an object recognition device 16, a communication device 20, a human machine interface (HMI) 30, a vehicle sensor 40, a navigation device 50, a map positioning unit (MPU) 60, a driving operator 80, an automated driving control device 100, a travel driving force output device 200, a brake device 210, and a steering device 220. These devices or equipment are connected to each other by a multiplex communication line such as a controller area network (CAN) communication line, a serial communication line, a wireless communication network, or the like. The configuration illustrated in FIG. 1 is merely an example, and a part of the configuration may be omitted or other constituents may be added thereto.

The camera 10 is, for example, a digital camera using a solid-state imaging device such as a charge coupled device (CCD) or a complementary metal oxide semiconductor (CMOS). The camera 10 is attached to any location on the vehicle (hereinafter, the host vehicle M) in which the vehicle system 1 is mounted. The camera 10 is attached in a vehicle cabin, for example. In the case of forward imaging, the camera 10 is attached to, for example, an upper portion of a front windshield, a rear surface of a rearview mirror, or the like. The camera 10, for example, periodically and repeatedly images surroundings of the host vehicle M. The camera 10 may be a stereo camera.

The radar device 12 radiates radio waves such as millimeter waves to the surroundings of the host vehicle M and detects radio waves (reflected waves) reflected by the object to detect at least a position (a distance and orientation) of the object. The radar device 12 is attached to any location on the host vehicle M. The radar device 12 may detect a position and the speed of the object using a frequency modulated continuous wave (FM-CW) scheme.

The LIDAR 14 irradiates the surroundings of the host vehicle M with light (or an electromagnetic wave having a wavelength close to that of light) and measures scattered light. The LIDAR 14 detects a distance to a target based on a time from light emission to light reception. The light to be radiated is, for example, pulsed laser light. The LIDAR 14 is attached to any location on the host vehicle M.

The object recognition device 16 performs sensor fusion processing on detection results of some or all of the camera 10, the radar device 12, and the LIDAR 14 to recognize a position, type, speed, and the like of the object. The object recognition device 16 outputs recognition results to the automated driving control device 100. The object recognition device 16 may output the detection results of the camera 10, the radar device 12, and the LIDAR 14 as they are to the automated driving control device 100. The object recognition device 16 may be omitted from the vehicle system 1.

The communication device 20, for example, communicates with another vehicle present around the host vehicle M using a cellular network, a Wi-Fi network, Bluetooth (registered trademark), dedicated short range communication (DSRC), or the like or communicates with various server devices via a wireless base station.

The HMI 30 presents various types of information to the occupant of the host vehicle M and receives an input operation from the occupant. The HMI 30 includes various display devices, speakers, buzzers, touch panels, switches, keys, and the like.

The vehicle sensor 40 includes, for example, a vehicle speed sensor that detects the speed of the host vehicle M, an acceleration sensor that detects an acceleration, a yaw rate sensor that detects an angular speed around a vertical axis, and an orientation sensor that detects a direction of the host vehicle M.

The navigation device 50 includes, for example, a global navigation satellite system (GNSS) receiver 51, a navigation HMI 52, and a route determiner 53. The navigation device 50 holds first map information 54 in a storage device such as a hard disk drive (HDD) or a flash memory. The GNSS receiver 51 specifies a position of the host vehicle M based on a signal received from GNSS satellites. The position of the host vehicle M may be specified or corrected by an inertial navigation system (INS) using an output of the vehicle sensor 40. The navigation HMI 52 includes a display device, a speaker, a touch panel, keys, and the like. The navigation HMI 52 may be partly or wholly shared with the HMI 30 described above. The route determiner 53, for example, determines a route (hereinafter, an on-map route) from the position of the host vehicle M specified by the GNSS receiver 51 (or any input position) to a destination input by the occupant using the navigation HMI 52 by referring to the first map information 54. The first map information 54 is, for example, information in which a road shape is represented by links indicating roads and nodes connected by the links. The first map information 54 may include a curvature of the road, point of interest (POI) information, and the like. The on-map route is output to the MPU 60. The navigation device 50 may perform route guidance using the navigation HMI 52 based on the on-map route. The navigation device 50 may be realized, for example, by a function of a terminal device such as a smartphone or a tablet terminal possessed by the occupant. The navigation device 50 may transmit a current position and a destination to a navigation server via the communication device 20 and acquire the same route as the on-map route from the navigation server.

The MPU 60 includes, for example, a recommended lane determiner 61, and holds second map information 62 in a storage device such as an HDD or a flash memory. The recommended lane determiner 61 divides the on-map route provided from the navigation device 50 into a plurality of blocks (for example, divides the route every 100 [m] in a traveling direction of the vehicle), and determines a recommended lane for each block by referring to the second map information 62. The recommended lane determiner 61 determines in which lane from the left the host vehicle M travels. The recommended lane determiner 61 determines the recommended lane so that the host vehicle M can travel on a reasonable route for travel to a branch destination when there is a branch location in the on-map route.

The second map information 62 is map information with higher accuracy than the first map information 54. The second map information 62 includes, for example, information on a center of the lane or information on a boundary of the lane. Further, the second map information 62 may include road information, traffic regulation information, address information (an address and postal code), facility information, telephone number information, and the like. The second map information 62 may be updated at any time by the communication device 20 communicating with another device.

The driving operator 80 includes, for example, an accelerator pedal, a brake pedal, a shift lever, and other operators, in addition to a steering wheel 82. A sensor that detects an amount of operation or the presence or absence of the operation is attached to the driving operator 80, and a result of the detection is output to the automated driving control device 100 or some or all of the travel driving force output device 200, the brake device 210, and the steering device 220. The operator does not necessarily have to be annular and may be in the form of a variant steer, joystick, or button, for example.

The automated driving control device 100 includes, for example, a first controller 120 and a second controller 160. The first controller 120 and the second controller 160 are realized, for example, by a hardware processor such as a central processing unit (CPU) executing a program (software). Further, some or all of these components may be realized by hardware (circuit; including circuitry) such as a large scale integration (LSI), an application specific integrated circuit (ASIC), a field-programmable gate array (FPGA), or a graphics processing unit (GPU), or may be realized by software and hardware in cooperation. The program may be stored in a storage device (a storage device including a non-transitory storage medium) such as an HDD or a flash memory of the automated driving control device 100 in advance or may be stored in a detachable storage medium such as a DVD or a CD-ROM and installed in the HDD or flash memory of the automated driving control device 100 by the storage medium (a non-transitory storage medium) being mounted in a drive device.

Figure 2:
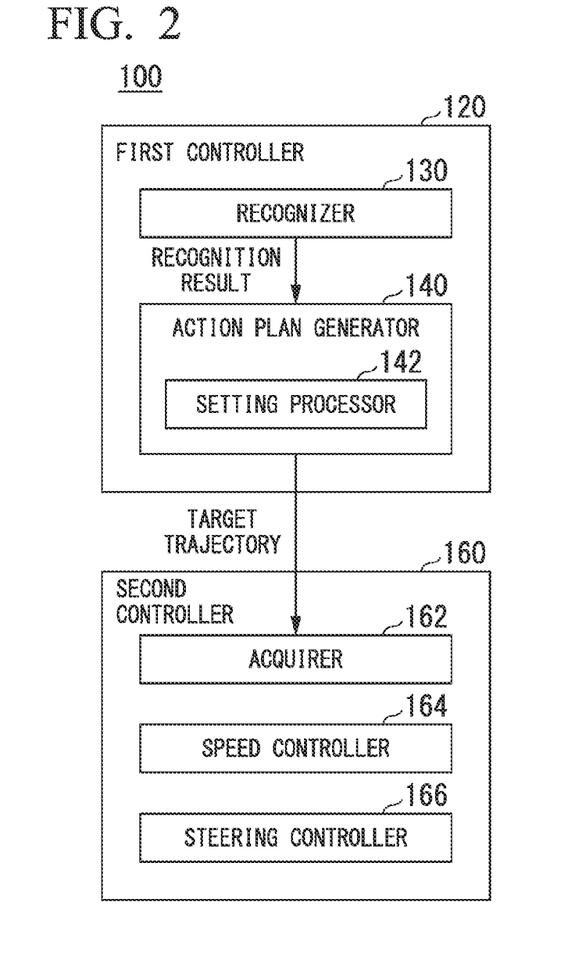
FIG. 2 is a functional configuration diagram of a first controller and a second controller.

FIG. 2 is a functional configuration diagram of the first controller 120 and the second controller 160. The first controller 120 includes, for example, a recognizer 130 and an action plan generator 140. The first controller 120 realizes, for example, a function using artificial intelligence (AI) and a function using a previously given model in parallel. For example, a function of "recognizing an intersection" may be realized by recognition of the intersection using deep learning or the like and recognition based on previously given conditions (there is a signal which can be subjected to pattern matching, a road sign, or the like) being executed in parallel and scored for comprehensive evaluation. Accordingly, the reliability of automated driving is ensured.

The recognizer 130 recognizes a status such as a position, speed, and acceleration of an object present around the host vehicle M based on information input from the camera 10, the radar device 12, and the LIDAR 14 via the object recognition device 16. The position of the object, for example, is recognized as a position at absolute coordinates with a representative point (a centroid, a drive shaft center, or the like) of the host vehicle M as an origin, and is used for control. The position of the object may be represented by a representative point such as a centroid or a corner of the object or may be represented by an area. The "status" of the object may include an acceleration or jerk of the object, or an "action status" (for example, whether or not the object is changing lanes or is about to change lanes).

The recognizer 130, for example, recognizes a lane (a traveling lane) in which the host vehicle M is traveling. For example, the recognizer 130 compares a pattern of road demarcation lines (for example, an arrangement of solid lines and broken lines) obtained from the second map information 62 with a pattern of road demarcation lines around the host vehicle M recognized from an image captured by the camera 10 to recognize the traveling lane. The recognizer 130 may recognize not only the road demarcation lines but also a traveling road boundary (a road boundary) including road demarcation lines, a road shoulder, a curb, a median strip, a guard rail, or the like to recognize the traveling lane. In this recognition, the position of the host vehicle M acquired from the navigation device 50 or a processing result of an INS may be additionally considered. The recognizer 130 recognizes a temporary stop line, an obstacle, a red signal, a toll gate, and other road events.

The recognizer 130 recognizes a position or posture of the host vehicle M with respect to the traveling lane when recognizing the traveling lane. The recognizer 130 may recognize, for example, a deviation of a reference point of the host vehicle M from a center of the lane and an angle formed between a traveling direction of the host vehicle M and a line connecting along the center of the lane as a relative position and posture of the host vehicle M with respect to the traveling lane. Instead, the recognizer 130 may recognize, for example, a position of the reference point of the host vehicle M with respect to any one of side end portions (the road demarcation line or the road boundary) of the traveling lane as the relative position of the host vehicle M with respect to the traveling lane.

In principle, the action plan generator 140 generates a target trajectory along which the host vehicle M will travel in the future automatically (without depending on an operation of a driver) so that the host vehicle M can travel on the recommended lane determined by the recommended lane determiner 61 and respond to a surroundings situation of the host vehicle M. The target trajectory includes, for example, the speed element. For example, the target trajectory is represented as a sequence of points (trajectory points) to be reached by the host vehicle M. The trajectory point is a point that the host vehicle M is to reach for each predetermined traveling distance (for example, several meters) along a road, and a target speed and a target acceleration at every predetermined sampling time (for example, every several tenths of a [sec]) are separately generated as a part of the target trajectory. The trajectory point may be a position that the host vehicle M is to reach at the sampling time at every predetermined sampling time. In this case, information on the target speed or the target acceleration is represented by an interval between the trajectory points.

When the action plan generator 140 generates the target trajectory, the action plan generator 140 may set an event of automated driving. Examples of the automated driving event include a constant speed traveling event, a low speed following driving event, a lane changing event, a branching event, a merging event, and a takeover event. The action plan generator 140 generates a target trajectory according to an activated event. The action plan generator 140 includes a setting processor 142, and controls the vehicle M based on a risk area set by the setting processor 142. Details of the risk area and the setting processor 142 will be described below.

The second controller 160 controls the travel driving force output device 200, the brake device 210, and the steering device 220 so that the host vehicle M passes through the target trajectory generated by the action plan generator 140 at a scheduled time.

The second controller 160 includes, for example, an acquirer 162, a speed controller 164, and a steering controller 166. The acquirer 162 acquires information on the target trajectory (trajectory points) generated by the action plan generator 140 and stores the information on the target trajectory in a memory (not shown). The speed controller 164 controls the travel driving force output device 200 or the brake device 210 based on the speed element incidental to the target trajectory stored in the memory. The steering controller 166 controls the steering device 220 according to a bent state of the target trajectory stored in the memory. Processing of the speed controller 164 and the steering controller 166 is realized by, for example, a combination of feedforward control and feedback control. For example, the steering controller 166 executes a combination of feedforward control according to a curvature of a road in front of the host vehicle M and feedback control based on a deviation from the target trajectory.

The travel driving force output device 200 outputs a travel driving force (torque) for traveling of the vehicle to driving wheels. The travel driving force output device 200 includes, for example, a combination of an internal combustion engine, an electric motor, a transmission, and the like, and an electronic control unit (ECU) that controls these. The ECU controls the above configuration according to information input from the second controller 160 or information input from the driving operator 80.

The brake device 210 includes, for example, a brake caliper, a cylinder that transfers hydraulic pressure to the brake caliper, an electric motor that generates hydraulic pressure in the cylinder, and a brake ECU. The brake ECU controls the electric motor according to information input from the second controller 160 or information input from the driving operator 80 so that a brake torque according to a braking operation is output to each wheel. The brake device 210 may include a mechanism that transfers the hydraulic pressure generated by an operation of the brake pedal included in the driving operator 80 to the cylinder via a master cylinder, as a backup. The brake device 210 is not limited to the configuration described above and may be an electronically controlled hydraulic brake device that controls an actuator according to information input from the second controller 160 and transfers the hydraulic pressure of the master cylinder to the cylinder.

The steering device 220 includes, for example, a steering ECU and an electric motor. The electric motor, for example, changes directions of steerable wheels by causing a force to act on a rack and pinion mechanism. The steering ECU drives the electric motor according to the information input from the second controller 160 or the information input from the driving operator 80 to change the directions of the steerable wheels.

[Processing Executed by Setting Processor]

The setting processor 142 sets the risk area at a first reference position based on an end of an obstacle in a traveling direction of the mobile object when a predicted trajectory in which another vehicle is estimated to move and a future trajectory of the vehicle M interfere with each other, and the length of a target area (for example, a shielded area) corresponding to the predicted trajectory in a predicted trajectory direction is equal to or larger than a predetermined length with respect to the target area difficult for the recognizer 130 to recognize due to the obstacle present around the vehicle M, and controls at least the acceleration and deceleration of the vehicle M based on the set risk area. Hereinafter, these processing will be described. In the following description, an example in which the processing is performed at a T-shaped road will be described, but the processing may also be executed in another road structure such as an intersection instead of (or in addition to) T-shaped road.

Figure 3:
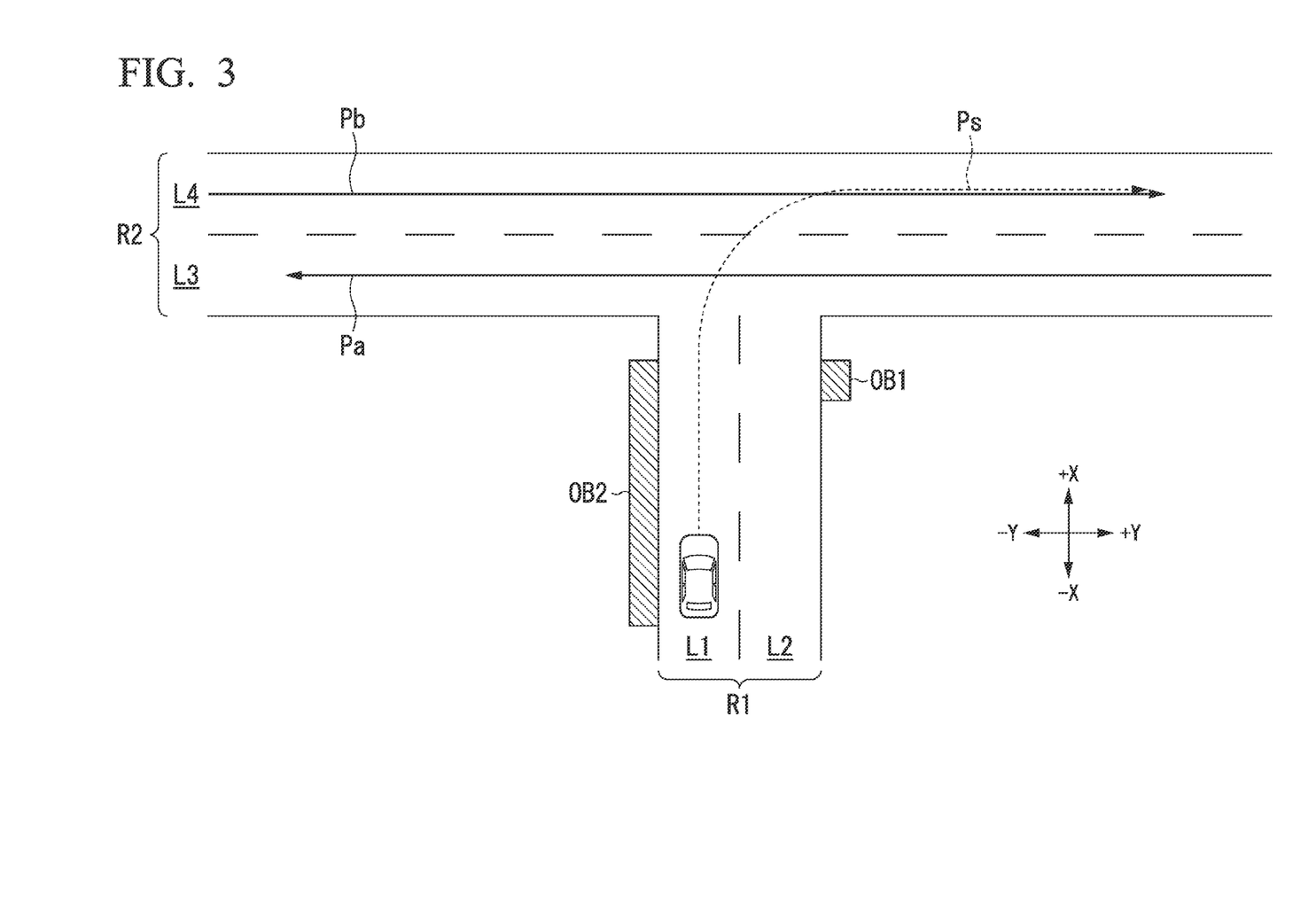
FIG. 3 is a diagram (No. 1) showing processing of a setting processor.

FIG. 3 is a diagram (No. 1) showing processing of the setting processor 142. In FIG. 3, the vehicle M tries to turn right at a T-shaped road. The T-shaped road is formed of a first road R1 and a second road R2. The first road R1 extends in an X direction and disappears in contact with the second road R2. The second road R2 extends in a Y direction orthogonal to the X direction. The first road R1 includes a lane L1 and a lane L2. The lane L1 is a lane in which a vehicle traveling in a positive X direction travels, and the lane L2 is a lane (opposite lane) in which a vehicle traveling in a negative X direction travels. The second road R2 includes a lane L3 and a lane L4. The lane L3 is a lane in which a vehicle traveling in a negative Y direction travels, and the lane L4 is a lane in which a vehicle traveling in a positive Y direction travels. An obstacle OB1 exists in a positive Y direction of the lane L2 In front of the T-shaped road. An obstacle OB2 exists in a negative Y direction of the lane L1 in front of the T-shaped road.

The vehicle M is scheduled to travel in the lane L1 and enter the lane L4 in the T-shaped road. The vehicle M is scheduled to enter the lane L4 based on a future trajectory Ps. The scheduled trajectory Pa is a trajectory on which a vehicle traveling in the lane L3 is scheduled to move. The scheduled trajectory Pb is a trajectory on which a vehicle traveling in the lane L4 is scheduled to move.

The setting processor 142 generates the future trajectory Ps, the scheduled trajectory Pa, and the scheduled trajectory Pb, and determines whether or not the future trajectory Ps and the scheduled trajectory Pa or the scheduled trajectory Pb interfere with each other. Hereinafter, the future trajectory Pa may be referred to as a future trajectory, and one or both of the scheduled trajectory Pa and the scheduled trajectory Pb may be referred to as a "scheduled trajectory". Interference means that two trajectories intersect or that the two trajectories approach within a predetermined distance. As illustrated in FIG. 3, when the future trajectory and the scheduled trajectory interfere with each other, the setting processor 142 performs processing illustrated in FIG. 4.

Figure 4:
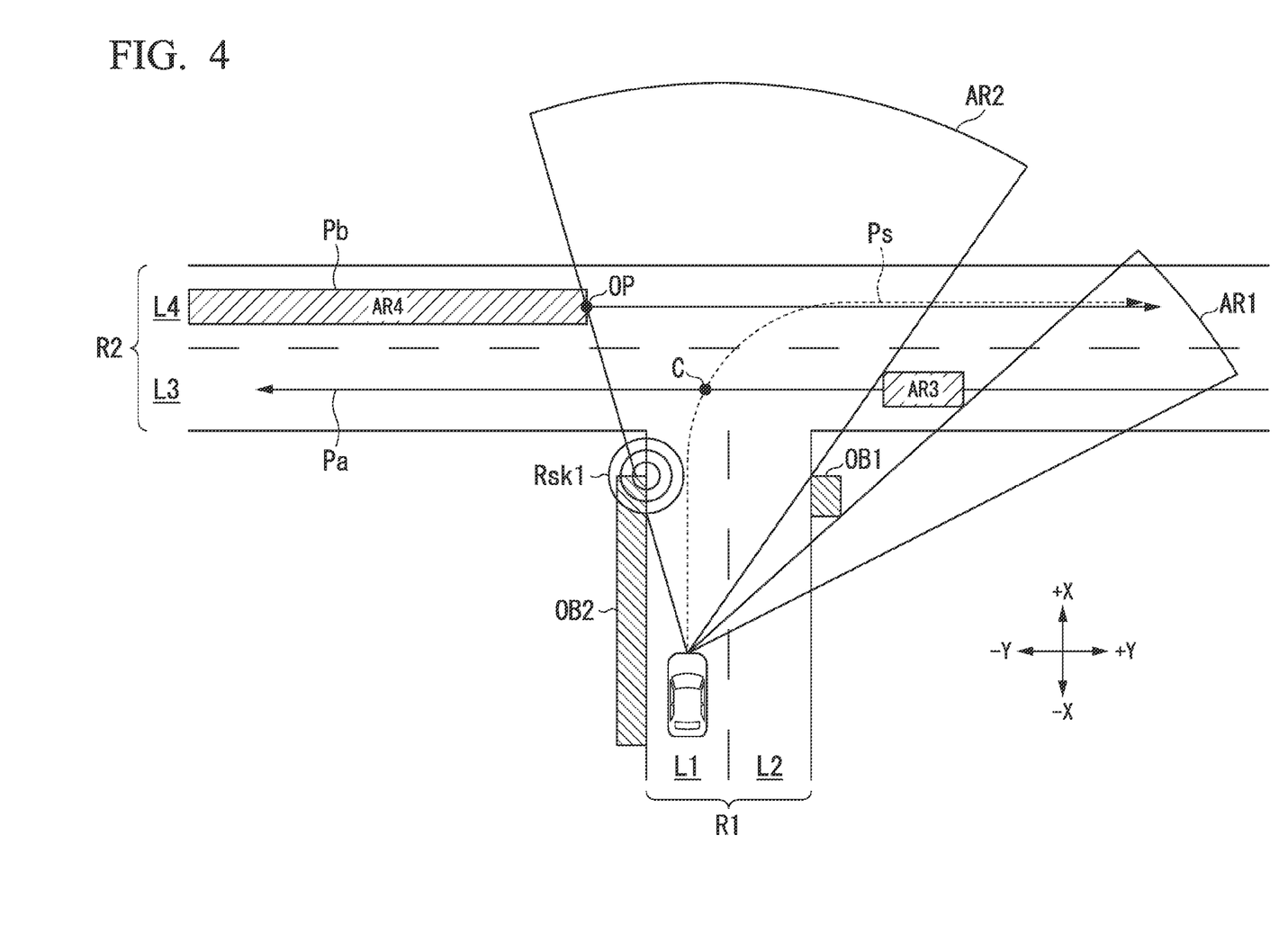
FIG. 4 is a diagram (No. 2) showing the processing of the setting processor.

FIG. 4 is a diagram (No. 2) showing the processing of the setting processor 142. Differences from FIG. 3 will be described. When the obstacle OB1 and the obstacle OB2 do not exist, the recognizer 130 can recognize substantially the entire situation of the road R2 illustrated in FIG. 4. However, since the obstacle OB1 and the obstacle OB2 shield (or make it difficult) the recognition of the recognizer 130, areas that can be recognized by the recognizer 130 are the area AR1 and the area AR2. The recognizer 130 cannot recognize areas (areas AR3 and AR4) other than the areas AR1 and AR2 due to the obstacle OB1. The "area AR3" or the "area AR4" is an example of the "target area corresponding to the predicted trajectory".

The area AR3 is an area included in the lane L3. The area AR4 is an area included in the lane L4. The area AR3 and the area AR4 are areas set with reference to, for example, a center or scheduled trajectory of the lane. The area AR3 may be, for example, an area including a scheduled trajectory between the area AR1 and the area AR2, or may be a rectangular range set to fit between the area AR1 and the area AR2 as illustrated. This rectangle has, for example, a predetermined width in the X direction.

The setting processor 142 calculates ranges of the area AR3 and the area AR4 based on, for example, the position of the vehicle M, a position of the obstacle (a distance from the vehicle M, a direction of the obstacle with respect to the vehicle M, or the like), and a position of the lane. The setting processor 142 calculates the length of the area AR3 in a direction in which the lane extends (hereinafter referred to as an "area length A") and the length of the area AR4 in the direction in which the lane extends (hereinafter referred to as a "area length B"). The setting processor 142 may set the area length B to infinity or may set the area length B as the length from an end portion of the area AR2 in the negative Y direction to an end portion of a range in which the recognizer 130 can recognize when there is no obstacle OB2 in the negative Y direction.

The setting processor 142 determines whether or not each of the area length A and the area length B is equal to or larger than a threshold value. The threshold value is, for example, the length based on the length of a general vehicle (the length of the vehicle in a direction in which the vehicle travels). The threshold value is, for example, the length of one vehicle and is, for example, the length of about 3 m, 4 m, or 5 m. It is assumed that the area length A is smaller than the threshold value and the area length B is equal to or larger than the threshold value.

The areas AR3 and AR4 are areas in which a vehicle entering the T-shaped road travels ("areas in which a mobile object directed to an intersection between the predicted trajectory and the future trajectory moves"). In this processing, an area in the negative Y direction relative to the T-shaped road in the lane L3 and an area in the positive Y direction relative to the T-shaped road in the lane L4 may not be targets to be compared with the threshold value. That is, an area in which a vehicle passing through the T-shaped road travels is not a target to be compared with the threshold value even when the area is shielded by an obstacle. This is because a degree to which another vehicle traveling in these areas has an influence on the vehicle M is relatively small.

The setting processor 142 sets a risk area Rsk (details thereof will be described below) based on the obstacle OB2 that causes the area AR4 having an area length equal to or larger than a threshold value. The setting processor 142 sets the risk area with a position of the obstacle OB2 shielding a closest shielding point OP of the area AR4 as the first reference position. The closest shielding point OP is a position closest to an intersection C between a future trajectory Ps and a predicted trajectory Pa (or a predicted trajectory Pb) in the area AR4. The first reference position is a position of the obstacle OB2 closest to the T-shaped road (for example, an angle of the obstacle OB2 in the positive X direction and the positive Y direction).

Figure 5:
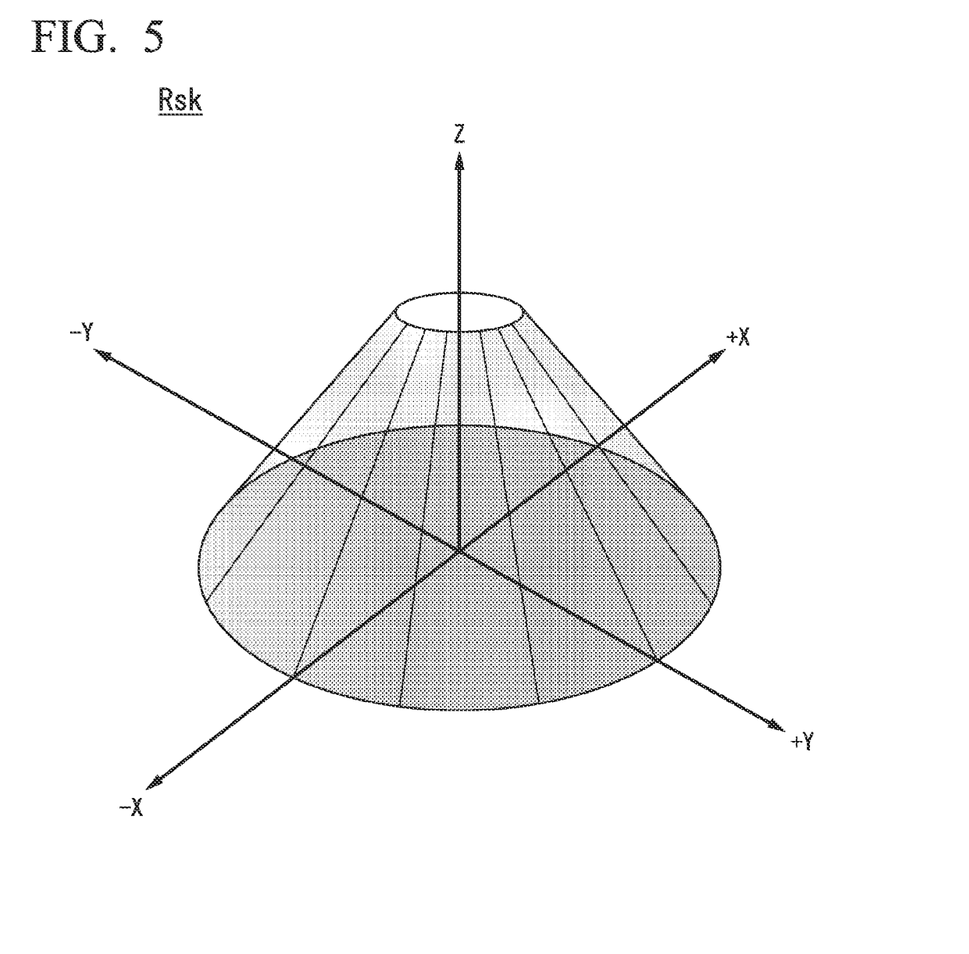
FIG. 5 is a diagram conceptually illustrating a risk area.

FIG. 5 is a diagram conceptually illustrating the risk area Rsk. The "risk area" is an area in which a risk potential is set. The "risk potential" is an index value indicating a level of a risk when the vehicle M enters the area in which the risk potential has been set. The risk area is an area in which a risk potential, which is an index value having a predetermined size (an index value exceeding zero), has been set. As illustrated in FIG. 5, a positive Z direction (a direction orthogonal to the X direction and the Y direction) indicates a level of the risk potential. For example, the risk potential is set to be higher when a position is closer to a center (for example, the first reference position of the obstacle OB2) of the risk potential, and the risk potential is set to be lower when a position is away from the center of the risk potential.

The risk area may be set based on a position of an object. The "object" is an object likely to have an influence on the traveling of the vehicle M, and includes various mobile objects such as a vehicle, a pedestrian, a two-wheeled vehicle, and an obstacle.

The automated driving control device 100 performs control so that the vehicle M decelerates (decreases the speed) as the vehicle M approaches the risk area. For example, the automated driving control device 100 decreases the speed of the vehicle M as the vehicle M approaches a position having a high-risk potential (a center of the risk area).

Figure 6:
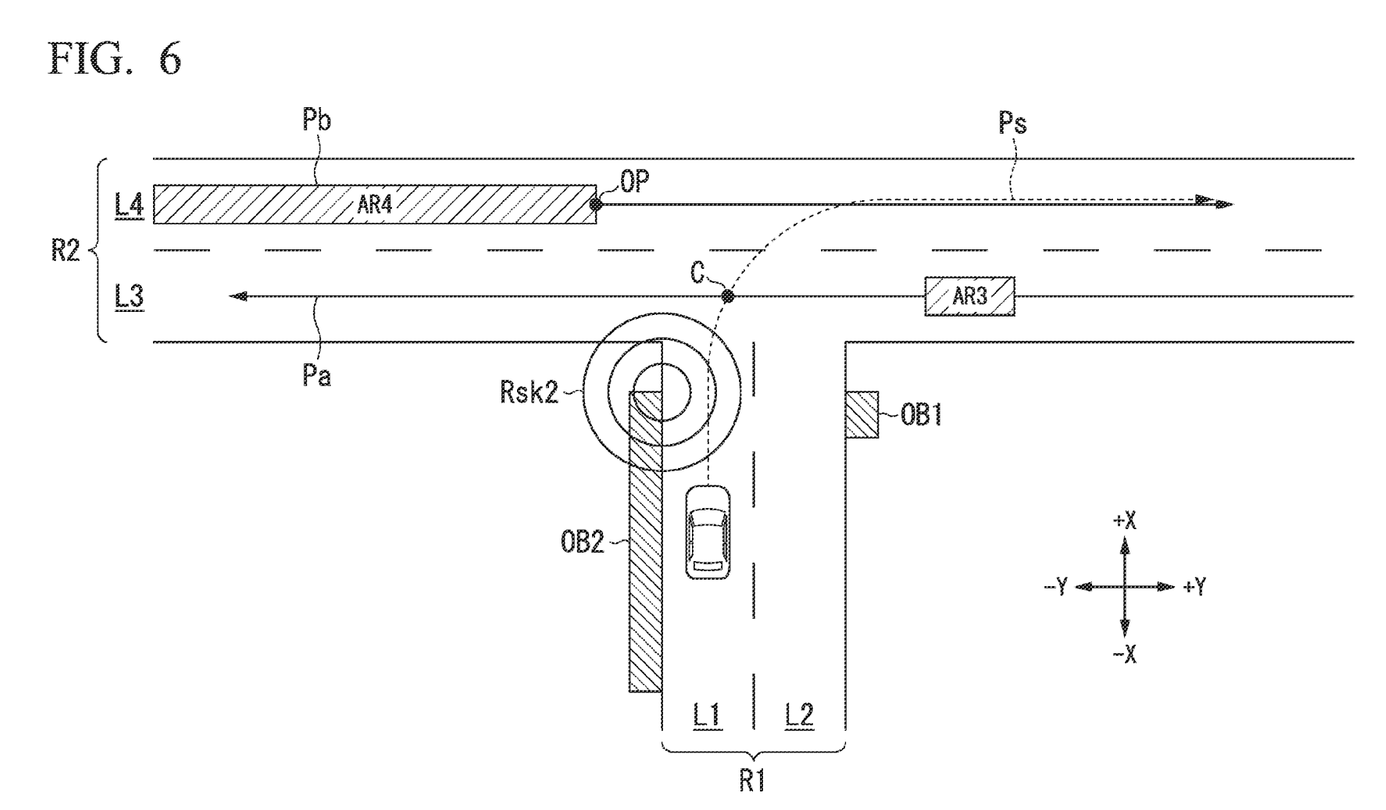
FIG. 6 is a diagram (No. 3) showing the processing of the setting processor.

FIG. 6 is a diagram (No. 3) showing the processing of the setting processor 142. For example, the setting processor 142 increases the size of the risk area as the vehicle M approaches the predicted trajectory. The size of the risk area Rsk2 in FIG. 6 is larger than the size of the risk area Rsk1 in FIG. 4 described above. For example, the risk area Rsk2 has the same magnitude of the risk potential as the risk area Rsk1 at a center, and has a shape in which a circumference of a bottom surface of the risk area Rsk1 is increased. A risk potential between a center and an outer edge of the risk area Rsk1 and the risk area Rsk2 may correspond to, for example, a coordinate in a Z direction of a straight line connecting the center and the outer edge, or may be correspond to a coordinate in the Z direction of a line connecting the center and the outer edge in a non-linear manner. The above risk potential may be stepped. The vehicle M is present at a position closer to the risk area Rsk2, as compared with the case of FIG. 4. In this case, the automated driving control device 100 decreases the speed of the vehicle M or increases a deceleration as compared with a scene of FIG. 4.

The vehicle M may be controlled so that the vehicle M does not enter the lane L2 (do not protrude). For example, a risk potential of the lane L2 is set to be higher than a risk potential of the lane L1.

For example, the size of the risk area is derived by Equation (1) below. "Size_risk" is the size of the risk area, "V_law" is a legal speed, and "thw_p" is a distance to the intersection C (an example of a "second reference position") between the future trajectory Ps and the predicted trajectory Pa from the vehicle M. The size of the risk area is derived, for example, using a function in which "V_law" and "thw_p" have been used. The function may include elements different from the above.

$$\text{Size\_risk}=f(V\_\text{law},\text{thw}\_p) \tag{1}$$

The size of the risk area may be derived by Equation (2) below. "K1" and "k2" are predetermined coefficients.

$$\text{Size\_risk}=f(k1\times V\_\text{law})\times(k2/\text{thw}\_p) \tag{2}$$

In the above function, a speed suitable for passing on the road may be used instead of "V_law". "V_law" or the suitable speed is an example of a "recommended speed". In the above function, a predetermined position (an example of the "second reference position") such as a position in which the first road and the second road intersect may be used instead of "thw_p". The size of the risk area may be derived based on a table generated to obtain the size of the risk area or another model instead of the above function.

Figure 7:
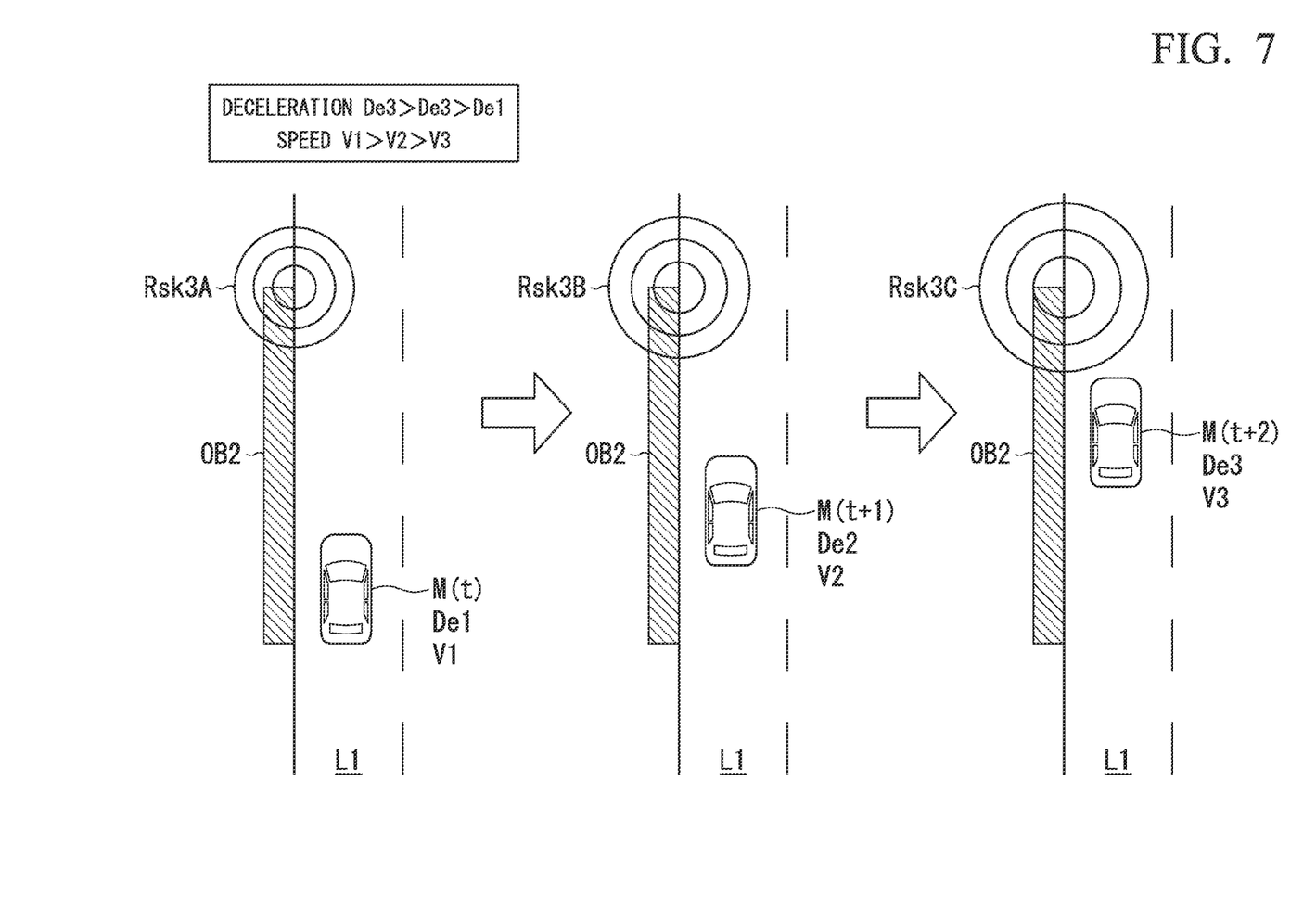
FIG. 7 is a diagram illustrating an example of a behavior of a vehicle.

FIG. 7 is a diagram illustrating an example of a behavior of the vehicle M. In FIG. 7, attention is focused on the vehicle M, the lane L1, and the obstacle OB1. At time t, a risk area Rsk3A is set. The vehicle M travels at a deceleration De1 and a speed V1 based on the risk area Rsk3A. At time t+1, a risk area Rsk3B is set when the vehicle M approaches an intersection. The vehicle M travels at a deceleration De2 and a speed V2 based on the risk area Rsk3B. At time t+2, a risk area Rsk3C is set when the vehicle M further approaches the intersection. The vehicle M travels at a deceleration De3 and a speed V3 based on the risk area Rsk3C.

Sizes of the risk areas are large in order of the risk area Rsk3C, the risk area Rsk3B, and the risk area Rsk3A. The deceleration is high in order of the deceleration De3, the deceleration De2, and the deceleration De1. The speed is high in order of the speed V1, the speed V2, and the speed V3. Magnitudes of the deceleration De3, the deceleration De2, and the deceleration De1 are not limited to the above, and may be in any other order.

Figure 8:
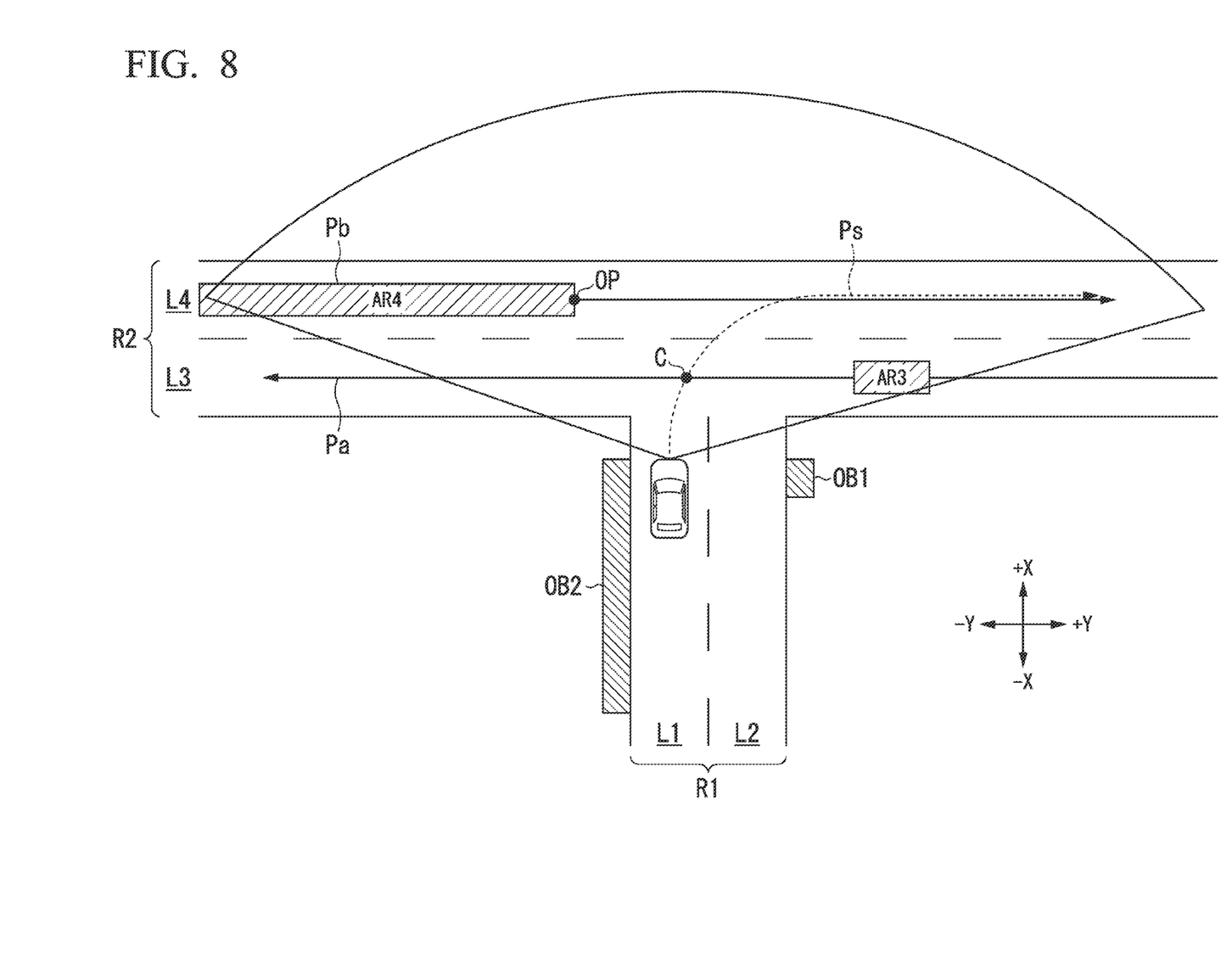
FIG. 8 is a diagram illustrating an example of a range that can be recognized when a vehicle approaches a T-shaped road.

As described above, the automated driving control device 100 sets the risk area for the obstacle OB1, and increases the size of the set risk area when the vehicle M approaches the intersection. The automated driving control device 100 controls the deceleration of the vehicle M based on the size of the risk area. Accordingly, the vehicle M sufficiently decelerates near the end of the obstacle. The vehicle M can recognize an area that has been a shielded area (the area AR3 or the area AR4) so far in a state in which deceleration has been sufficiently performed (or stopped), as illustrated in FIG. 8.

Accordingly, the automated driving control device 100 can further decelerate (or stop) or accelerates the vehicle based on a behavior of another vehicle, for example, when the other vehicle exists in an area not recognized so far, and causes the vehicle M to enter the lane L4 so that the vehicle M does not interfere with the other vehicle. For example, when the other vehicle does not exist in the area not recognized so far, the automated driving control device 100 can smoothly cause the vehicle M to enter the lane L4 based on a result of the recognition. Thus, the automated driving control device 100 can appropriately control the vehicle M.

A case in which the risk area is not set as in the present embodiment is considered. In this case, the vehicle may not be able to decelerate appropriately. The vehicle may not be able to smoothly enter a target lane after the area not recognized so far can be recognized. For example, the vehicle M may have an inappropriate speed at a point in time when the area not recognized so far (target area) can be recognized, and may relatively suddenly behave (accelerate, decelerate, stop, or the like) according to the presence or absence of another vehicle in the target area or a behavior of the other vehicle when the target area can be recognized.

On the other hand, in the present embodiment, since the deceleration is performed as described above, the vehicle M can appropriately respond according to the presence or absence of another vehicle in the target area or a behavior of the other vehicle, and is controlled so that the vehicle M can smoothly enter the target lane. That is, the automated driving control device 100 can appropriately control the vehicle M.

[Flowchart]

Figure 9:
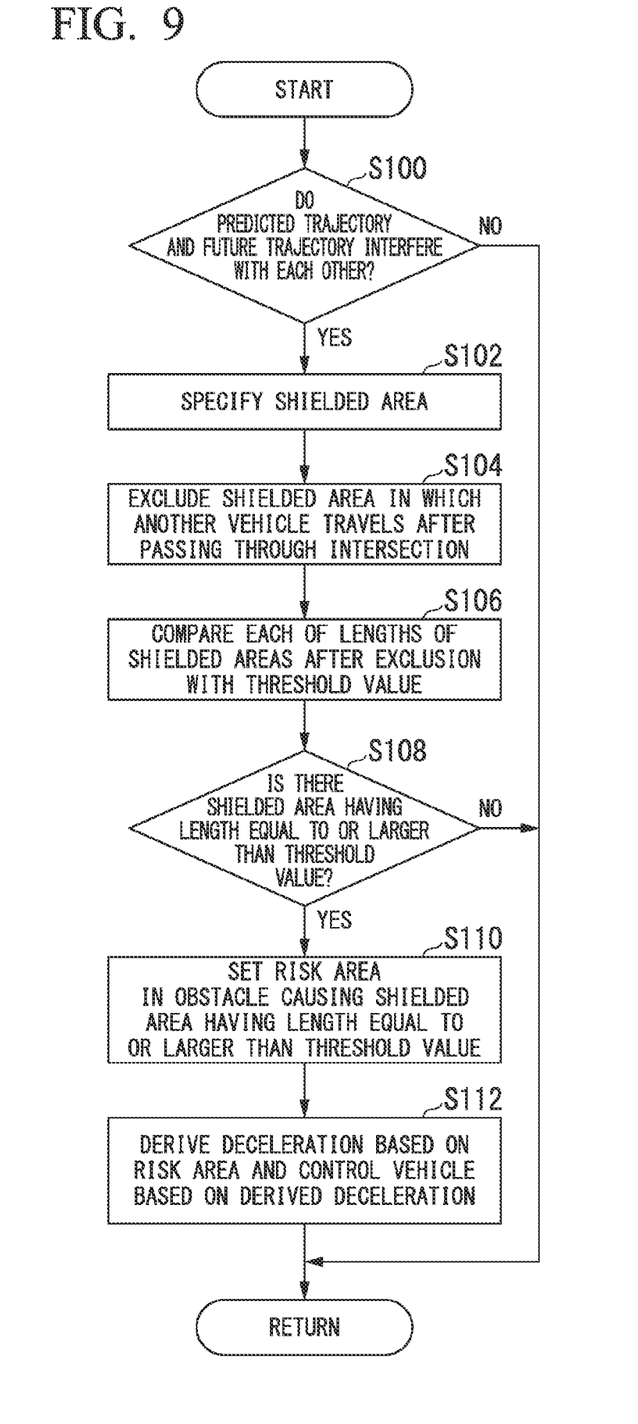
FIG. 9 is a flowchart illustrating an example of a flow of processing that executed by an automated driving control device.

FIG. 9 is a flowchart illustrating an example of a flow of processing that is executed by the automated driving control device 100. First, the setting processor 142 determines whether or not the predicted trajectory and the future trajectory interfere with each other (step S100). When the predicted trajectory and the future trajectory do not interfere with each other, one routine in this flowchart ends.

When the predicted trajectory and the future trajectory interfere with each other, the setting processor 142 specifies shielded areas shielded by an obstacle (step S102). Then, the setting processor 142 excludes the shielded area in which another vehicle travels after passing through the intersection among the shielded areas (step S104). Then, the setting processor 142 compares each of lengths of the shielded areas after exclusion with a threshold value (step S106). Then, the setting processor 142 determines whether or not there is the shielded area having the length equal to or larger than the threshold value (step S108). When there is no shielded area having a length equal to or larger than the threshold value, processing of one routine in the present flowchart ends.

When there is the shielded area having a length equal to or larger than the threshold value, the setting processor 142 sets the risk area in the obstacle based on the obstacle that causes the shielded area having a length equal to or larger than the threshold value, the position of the vehicle M, and a position of the predicted trajectory (step S110). Then, the action plan generator 140 derives the deceleration of the vehicle M based on the risk area, and controls the vehicle M based on the derived deceleration (step S112). Accordingly, processing of one routine of the present flowchart ends. This execution of each processing enables the automated driving control device 100 to appropriately control the vehicle M. Some of the above processing may be omitted.

The above processing may also be executed when a sign instructing the vehicle M to temporarily stop or a signal (a signal in a red signal state) indicating that the vehicle M is to be stopped does not exist near a location at which the lane L1 is connected to the road R2.

Figure 10:
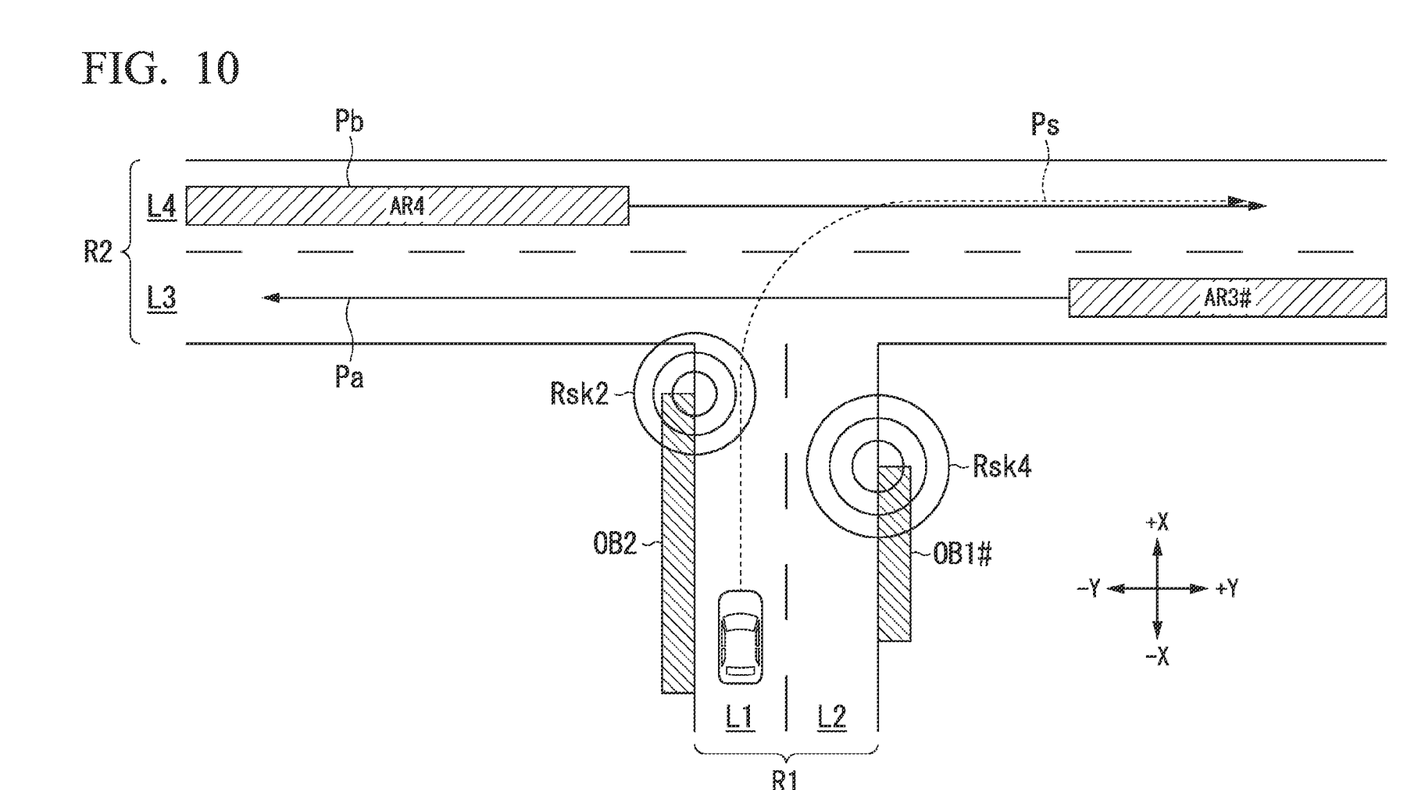
FIG. 10 is a diagram illustrating an example of a scene in which a risk area is set in an obstacle on an opposite lane side.

In the above-described example, it is assumed that the obstacle for which the risk area is set exists on the lane side in which the vehicle M travels. On the other hand, as illustrated in FIG. 10, when there is an obstacle OB1# causing the shielded area (area AR3# in FIG. 10) having a length equal to or larger than the threshold value, the setting processor 142 sets a risk area Rsk4. In this case, the automated driving control device 100 also controls the vehicle M based on the risk area. For example, since the risk area Rsk4 is set in the lane L2, it is difficult for the vehicle M to be influenced by the risk area Rsk4, and deceleration due to the influence of the risk area Rsk4 is curbed.

According to the embodiment described above, the automated driving control device 100 can control the vehicle M more appropriately by setting the risk area at the first reference position based on the end of the object in the traveling direction of the vehicle when a predicted trajectory on which another vehicle M is estimated to move and a future trajectory of the vehicle M interfere with each other and the length of the target area corresponding to the predicted trajectory in the predicted trajectory direction is equal to or larger than a predetermined length with respect to the target area difficult for the recognizer 130 to recognize due to an object present around the vehicle M, and controlling at least the speed of the vehicle M based on the set risk area.

Although, in the present embodiment, a case in which a function of the setting processor 142 is mounted on the vehicle that performs automated driving has been described, the function of the setting processor 142 may be mounted on a vehicle that automatically controls the deceleration, for example. For example, in this vehicle, a driver controls the setting processor 142 controls deceleration. The function of the setting processor 142 may be mounted on a device different from the vehicle, and the vehicle M may control the deceleration based on information on the risk area acquired from the different device.

While forms for carrying out the present invention have been described using the embodiments, the present invention is not limited to these embodiments at all, and various modifications and substitutions can be made without departing from the gist of the present invention.

What is claimed is:

1. A mobile object control device comprising:
a storage device configured to store a program; and
a hardware processor,
wherein the hardware processor
recognizes a surroundings situation of a mobile object,
executes control processing for controlling an acceleration and deceleration of the mobile object based on the recognized surroundings situation,
sets a risk area at a first reference position based on an end of an obstacle present around the mobile object in a traveling direction of the mobile object when a predicted trajectory in which another mobile object is estimated to move and a future trajectory of the mobile object interfere with each other, and a length of a target area corresponding to the predicted trajectory in a predicted trajectory direction is equal to or larger than a predetermined length with respect to the target area difficult to recognize due to the obstacle, and controls at least a speed of the mobile object based on the set risk area, in the control processing, by executing a program stored in the storage device, sets the risk area when the predicted trajectory and the future trajectory interfere with each other, the length of the target area in the predicted trajectory direction is equal to or larger than the predetermined length, and the target area is an area in which the mobile object directed to an intersection of the predicted trajectory and the future trajectory moves, and does not set the risk area when the predicted trajectory and the future trajectory interfere with each other, the length of the target area in the predicted trajectory direction is equal to or larger than the predetermined length, and the target area is an area in which the mobile object passing through the intersection of the predicted trajectory and the future trajectory moves.

2. The mobile object control device according to claim 1, wherein the hardware processor decelerates the mobile object when the mobile object approaches the risk area.

3. The mobile object control device according to claim 1, wherein the hardware processor increases a size of the risk area to be set when the mobile object approaches the predicted trajectory.

4. The mobile object control device according to claim 1, wherein the hardware processor
increases a size of the risk area to be set when the mobile object approaches the predicted trajectory, and
decelerates the mobile object when the mobile object approaches the risk area.

5. The mobile object control device according to claim 1, wherein the hardware processor controls at least the speed of the mobile object based on the risk area and moves the mobile object so that the mobile object does not enter an opposite lane.

6. The mobile object control device according to claim 1, wherein the hardware processor determines a size of the risk area based on a recommended speed on a road on which there is the mobile object and a distance from a second reference position based on an intersection between the predicted trajectory and the future trajectory to the mobile object.

7. A mobile object control method comprising:
recognizing, by a computer, a surroundings situation of a mobile object;
controlling, by the computer, an acceleration and deceleration of the mobile object based on the recognized surroundings situation;
setting, by the computer, a risk area at a first reference position based on an end of an obstacle present around the mobile object in a traveling direction of the mobile object when a predicted trajectory in which another mobile object is estimated to move and a future trajectory of the mobile object interfere with each other, and a length of a target area corresponding to the predicted trajectory in a predicted trajectory direction is equal to or larger than a predetermined length with respect to the target area difficult to recognize due to the obstacle, and controlling at least a speed of the mobile object based on the set risk area;
setting, by the computer, the risk area when the predicted trajectory and the future trajectory interfere with each other, the length of the target area in the predicted trajectory direction is equal to or larger than the predetermined length, and the target area is an area in which the mobile object directed to an intersection of the predicted trajectory and the future trajectory moves; and
not setting, by the computer, the risk area when the predicted trajectory and the future trajectory interfere with each other, the length of the target area in the predicted trajectory direction is equal to or larger than the predetermined length, and the target area is an area in which the mobile object passing through the intersection of the predicted trajectory and the future trajectory moves.

8. A computer-readable non-transitory storage medium having a program stored therein, the program causing a computer to:

recognize a surroundings situation of a mobile object;

control an acceleration and deceleration of the mobile object based on the recognized surroundings situation;

set a risk area at a first reference position based on an end of an obstacle present around the mobile object in a traveling direction of the mobile object when a predicted trajectory in which another mobile object is estimated to move and a future trajectory of the mobile object interfere with each other, and a length of a target area corresponding to the predicted trajectory in a predicted trajectory direction is equal to or larger than a predetermined length with respect to the target area difficult to recognize due to the obstacle, and control at least a speed of the mobile object based on the set risk area;

sets the risk area when the predicted trajectory and the future trajectory interfere with each other, the length of the target area in the predicted trajectory direction is equal to or larger than the predetermined length, and the target area is an area in which the mobile object directed to an intersection of the predicted trajectory and the future trajectory moves; and does not set the risk area when the predicted trajectory and the future trajectory interfere with each other, the length of the target area in the predicted trajectory direction is equal to or larger than the predetermined length, and the target area is an area in which the mobile object passing through the intersection of the predicted trajectory and the future trajectory moves.

* * * * *